(12) United States Patent
Kim et al.

(10) Patent No.: US 10,749,842 B2
(45) Date of Patent: Aug. 18, 2020

(54) COMMUNICATION SYSTEM AND METHOD FOR NETWORK ADDRESS TRANSLATION

(71) Applicant: Samsung Electronics Co., Ltd., Suwon-si, Gyeonggi-do (KR)

(72) Inventors: Yong Kim, Hwaseong-si (KR); Byung-seung Kim, Seongnam-si (KR); In-chul Song, Ansan-si (KR); Hee-su Im, Hwaseong-si (KR); Seong-wook Cho, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 73 days.

(21) Appl. No.: 16/199,961

(22) Filed: Nov. 26, 2018

(65) Prior Publication Data

US 2019/0166090 A1 May 30, 2019

(30) Foreign Application Priority Data

Nov. 27, 2017 (KR) .......................... 10-2017-0159685
Oct. 10, 2018 (KR) .......................... 10-2018-0120606

(51) Int. Cl.
*G06F 15/16* (2006.01)
*H04L 29/12* (2006.01)
*H04L 29/06* (2006.01)
*H04L 1/00* (2006.01)

(52) U.S. Cl.
CPC .......... *H04L 61/256* (2013.01); *H04L 61/251* (2013.01); *H04L 61/2514* (2013.01); *H04L 61/2517* (2013.01); *H04L 61/6004* (2013.01); *H04L 69/04* (2013.01); *H04L 69/163* (2013.01); *H04L 69/167* (2013.01); *H04L 69/22* (2013.01); *H04L 1/0061* (2013.01)

(58) Field of Classification Search
USPC ....... 709/203, 206, 217, 219, 223, 224, 226, 709/228, 230, 232, 238; 370/229, 392, 370/400
See application file for complete search history.

(56) References Cited

U.S. PATENT DOCUMENTS 5,566,170 A * 10/1996 Bakke ..................... H04L 29/06
   370/392
6,157,955 A * 12/2000 Narad ..................... H04L 45/16
   709/228
7,251,247 B2   7/2007 Hamamoto et al.
   (Continued)

*Primary Examiner* — Quang N Nguyen
(74) *Attorney, Agent, or Firm* — Harness, Dickey & Pierce, P.L.C.

(57) ABSTRACT

A communication system configured to perform an address translation and a method of translating an address of the communication system are provided. The communication system configured to transceive a packet through a network includes a modem circuit configured to modulate the packet into a transmission signal to be transmitted to the network and demodulate a receiving signal from the network into the packet, and an address translation circuit configured to translate a network address of the packet, wherein the address translation circuit includes an embedded memory configured to receive a header of the packet from an external memory in which the packet is stored and store the header, a first translator configured to translate a format of the header, and a second translator configured to translate an address included in the header.

15 Claims, 17 Drawing Sheets

(56) References Cited

U.S. PATENT DOCUMENTS

| | | | |
|---|---|---|---|
| 7,293,113 B1 | 11/2007 | Krishna et al. | |
| 7,453,874 B1 | 11/2008 | Nguyen | |
| 7,852,843 B2 | 12/2010 | Liu et al. | |
| 8,739,289 B2 | 5/2014 | Nice et al. | |
| 9,479,597 B2 | 10/2016 | Vinapamula Venkata et al. | |
| 2004/0158640 A1* | 8/2004 | Philbrick | H04L 29/06 709/230 |
| 2006/0176884 A1* | 8/2006 | Fair | H04L 67/08 709/203 |
| 2006/0203721 A1* | 9/2006 | Hsieh | H04L 12/4633 370/229 |
| 2014/0211799 A1* | 7/2014 | Yu | H04L 45/745 370/392 |
| 2015/0195255 A1 | 7/2015 | L'Heureux et al. | |

* cited by examiner

FIG. 8

| < Translation Table > ||
|---|---|
| Public IP Address | Private IP Address |
| 135.26.32.7, 5003 | 10.0.0.2, 3327 |
| 135.26.32.7, 5002 | 10.0.0.3, 3327 |

COMMUNICATION SYSTEM AND METHOD FOR NETWORK ADDRESS TRANSLATION

CROSS-REFERENCE TO RELATED APPLICATION

This U.S. non-provisional application claims the benefit of priority under 35 U.S.C. § 119 to Korean Patent Application No. 10-2017-0159685, filed on Nov. 27, 2017, and Korean Patent Application No. 10-2018-0120606, filed on Oct. 10, 2018, both applications filed in the Korean Intellectual Property Office (KIPO), the disclosure of both of which are incorporated herein in their entirety by reference.

BACKGROUND

Various example embodiments of the inventive concepts relate to a communication system, and more particularly, to a hardware structure of a communication system configured to perform a network address translation for data communication, a communication apparatus, a method of translating a network address, and/or non-transitory computer readable media thereof.

A communication device or communication system for data communication may communicate with a network or communication device having a different address system by using a network address translation technique. Network address translation techniques may include customer-side translator (CLAT) and network address translation (NAT). The CLAT may be a technique of translating an IPv4 address into an IPv6 address or translating an IPv6 address into an IPv4 address so that hosts may freely communicate with IPv4 or IPv6 hosts via an IPv6 network. The NAT may refer to a technique of transceiving network traffic by a router, or equivalent networking device, and rewriting of a port number of a transmission protocol of an Internet protocol (IP) packet and IP addresses of a source and a destination by the router. When a network address translation is performed, since an IP packet is changed, a checksum of an IP header or a transmission protocol header has to be updated.

SUMMARY

Various example embodiments of the inventive concepts provide a communication system configured to efficiently perform address translation, a communication apparatus, an address translation method of the communication system, and/or non-transitory computer readable media thereof.

According to an aspect of at least one example embodiment of the inventive concepts, there is provided a communication system configured to transceive at least one packet through a network. The communication system includes a modem circuit configured to modulate the at least one packet into a transmission signal to be transmitted to the network and demodulate a received signal from the network into the at least one packet, and an address translation circuit configured to translate a network address of the at least one packet, the translating the network address of the at least one packet including, receiving a header of the at least one packet from an external memory in which the at least one packet is stored, and store the header of the at least one packet in an embedded memory, translating a format of the header of the at least one packet, and translating an address included in the header of the at least one packet.

According to another aspect of at least one example embodiment of the inventive concepts, there is provided a device including a memory, a communication processor configured to translate a network address of a first packet received through a network, and store a second packet including the translated network address in the memory, and an application processor configured to receive the second packet from the memory, drive an application program, and process the second packet.

According to another aspect of at least one example embodiment of the inventive concepts, there is provided an application processor including a communication function. The application processor includes at least one processor configured to execute an application program, a memory configured to be accessed by the at least one processor, and an address translation circuit configured to translate a network address included in a first header of at least one packet received from a network to conform to an address system of the application program, and store a second header including the translated network address in the memory.

According to another aspect of at least one example embodiment of the inventive concepts, there is provided a network address translation method of a communication system. The method includes storing, using at least one processor, a first Internet protocol (IP) packet received through a network in a first memory, the first IP packet including a header and a network address, copying, using the at least one processor, the header of the first IP packet stored in the first memory to an internal buffer of the at least one processor, translating, using the at least one processor, the network address included the first IP packet, and storing, using the at least one processor, a second IP packet, the second IP packet including the header and the translated network address.

BRIEF DESCRIPTION OF THE DRAWINGS

Various example embodiments of the inventive concepts will be more clearly understood from the following detailed description taken in conjunction with the accompanying drawings in which:

FIG. 8 illustrates a translation table according to at least one example embodiment;

DETAILED DESCRIPTION

Figure 1:
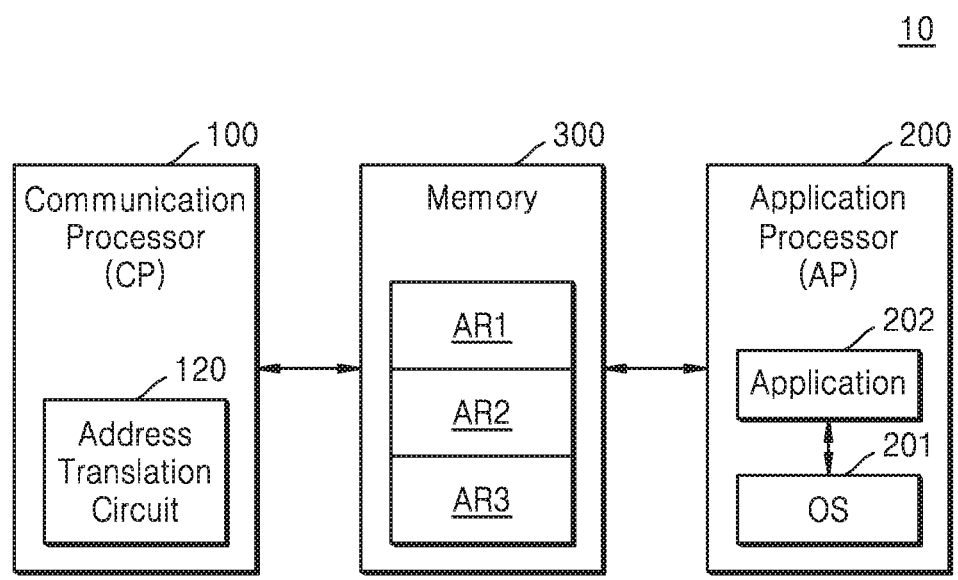
FIG. 1 is a block diagram of a communication device according to at least one example embodiment.

FIG. 1 is a block diagram of a communication device 10 according to at least one example embodiment.

Referring to FIG. 1, the communication device 10 may be an electronic device configured to perform data communication with at least one other electronic device. For example, the communication device 10 may be one of a smartphone, a tablet personal computer (PC), a laptop computer, a drone, a digital camera, a wearable computer, an Internet of Things (IoT) device, a vehicle driving device, a virtual reality device, an augmented reality device, and/or various other smart devices. In addition, the communication device 10 may be one of various electronic devices configured to perform data communication with an external electronic device through wired/wireless networks.

Referring to FIG. 1, the communication device 10 may include a communication processor 100, an application processor 200, and/or a memory 300, but is not limited thereto. In addition, the communication device 10 may further include other hardware and/or software components, such as a display module and/or an input/output (I/O) module, etc.

The application processor 200 may drive (e.g., execute) an operating system (OS) 201 of the communication device 10 and/or various application programs 202 to control a plurality of hardware and/or software components connected to the application processor 200, and process and calculate various data including multimedia data. In at least one example embodiment, the application processor 200 may be embodied by a system-on-chip (SoC), an FPGA, a multi-core processor, a multi-processor system, etc.

The communication processor 100 may transceive (e.g., transmit and/or receive) data during communication with other electronic devices connected through a network. In the data transceiving process, the communication processor 100 may transmit and receive data to and from the application processor 200. When the communication device 10 receives data through the network, for example, when the communication device 10 performs a data download operation, the communication processor 100 may transmit the received data to the application processor 200, and the application processor 200 may perform data processing operations, such as data calculation and storage operations. Conversely, when the communication device 10 transmits data through the network, for example, when the communication device 10 performs a data upload operation, the application processor 200 may transmit data to be uploaded to the communication processor 100, and the communication processor 100 may then transmit the data through the network. For example, when the communication device 10 performs a video streaming operation, the communication processor 100 may transmit received data to the application processor 200, and the application processor 200 may process data received from the communication processor 100 and display the processed data on a screen. According to at least one example embodiment, the communication processor 100 and the application processor 200 may be embodied in a single processor. Additionally, according to some example embodiments, the communication processor 100 and/or the application processor 200 may be embodied in two or more processors.

The memory 300 may store instructions or data, which are received from the application processor 200 and/or the communication processor 100 or generated by the application processor 200, but is not limited thereto. The memory 300 may be embodied by a volatile memory, for example, dynamic random access memory (DRAM), static random access memory (SRAM), etc. However, the example embodiments of the inventive concepts are not limited thereto, and the memory 300 may include a non-volatile memory, such as flash memory, magnetic RAM (MRAM), ferroelectric RAM (FeRAM), phase-change RAM (PRAM), and/or resistive RAM (ReRAM), etc. The memory 300 may refer to a memory chip and/or a memory module including a plurality of memory chips and/or memory devices included in the communication device 10.

As described above, since data is frequently transmitted and received between the communication processor 100 and the application processor 200, the memory 300 may operate as a shared memory that may be accessed by the communication processor 100 and the application processor 200. The communication processor 100 and the application processor 200 may transmit and receive data through the memory 300.

In at least one example embodiment, the memory 300 may include a first area AR1, a second area AR2, and a third area AR3, etc., but is not limited thereto, and in other example embodiments may have a greater or lesser number of areas. In at least one example embodiment, the first area AR1, the second area AR2, and the third area AR3 may be areas that may be physically and/or logically divided from each other in the memory chip and/or the memory module. In at least one example embodiment, the first area AR1, the second area AR2, and the third area AR3 may be memory devices that may be physically distinguished from each other in the communication device 10.

According to at least one example embodiment, the first area AR1 may be a dedicated area of the communication processor 100, which is exclusively used by the communication processor 100. The second area AR2 may be shared between the communication processor 100 and the application processor 200. For example, the second area AR2 may be a shared area for inter-processor communication (IPC) between the communication processor 100 and the application processor 200. The third area AR3 may be a dedicated area of the application processor 200, which is exclusively used by the application processor 200. However, the example embodiments are not limited thereto, and the various areas of the memory 300 may be arranged in other configurations/relationships.

Meanwhile, in the communication device 10 according to at least one example embodiment, the communication processor 100 may include an address translation circuit 120. The address translation circuit 120 may be embodied by hardware circuitry or a combination of hardware circuitry and software. The address translation circuit 120 may determine whether a translation of a network address of data transceived through the network is desired and/or necessary.

If it is determined that the translation of the network address of the data is desired and/or necessary, the address translation circuit 120 may translate the network address of the data based on a network address translation technique.

Data may be transmitted and/or received as a type of Internet protocol (IP) packet, and the address translation circuit 120 may translate a network address of the IP packet (e.g., may translate the network address included in the IP packet and/or associated with the IP packet, etc.). The address translation circuit 120 may translate a destination address of an IP packet received through the network into an address suitable for an address system of the application program 202 and/or translate a source address of an IP packet to be transmitted through the network into an address suitable for an address system of the network.

In at least one example embodiment, the address translation circuit 120 may support both customer side translator (CLAT) and network address translation (NAT), which are network address translation techniques. The CLAT may be an IP header format translation technique for translating an IPv4 header of an IP packet into an IPv6 header of an IP packet and/or translating an IPv6 header into an IPv4 header, so that the communication device 10 may freely communicate with other communication devices through network that is based on a specific Internet protocol (e.g., IPv6 or IPv4, etc.). The NAT may be an IP address translation technique for translating a private IP address (and/or an internal IP address associated with a private network, local network, intranet, etc.) into a public IP address (and/or a global IP address, for example an IP address accessible via the Internet, across networks, etc.). or conversely translating a public IP address into a private IP address. An IP address value and a port number of the source address and/or the destination address may be changed according to the NAT.

For example, the address translation circuit 120 may write (and/or copy) the IP packet having the translated network address (e.g., destination address, etc.) to the second area AR2 of the memory 300, but is not limited thereto. The application processor 200 may access the second area AR2 of the memory 300 and process the IP packet based on the translated network address. The IP packet may be copied to the third area AR3 of the memory 300 during the operation of processing the IP packet of the application processor 200, but is not limited thereto.

In addition, according to some example embodiments, when an IP packet is provided by the application processor 200, the IP packet may be stored in the second area AR2 of the memory 300, and the address translation circuit 120 may read the IP packet from the second area AR2 of the memory 300 and translate a network address of the IP packet. The IP packet having the translated network address may be stored in a dedicated memory of the communication processor 100, for example, the first area AR1 of the memory 300, but is not limited thereto.

As described above, when the communication processor 100 transmits the IP packet to the application processor 200 and/or receives the IP packet from the application processor 200, since the address translation circuit 120 based on hardware performs the network address translation, the application processor 200 may not need to perform an additional operation for the network address translation. Accordingly, the load of the application processor 200 may be reduced, and the number of times the IP packet is written (and/or coped) to or read from the memory 300 may be reduced.

Figure 2:
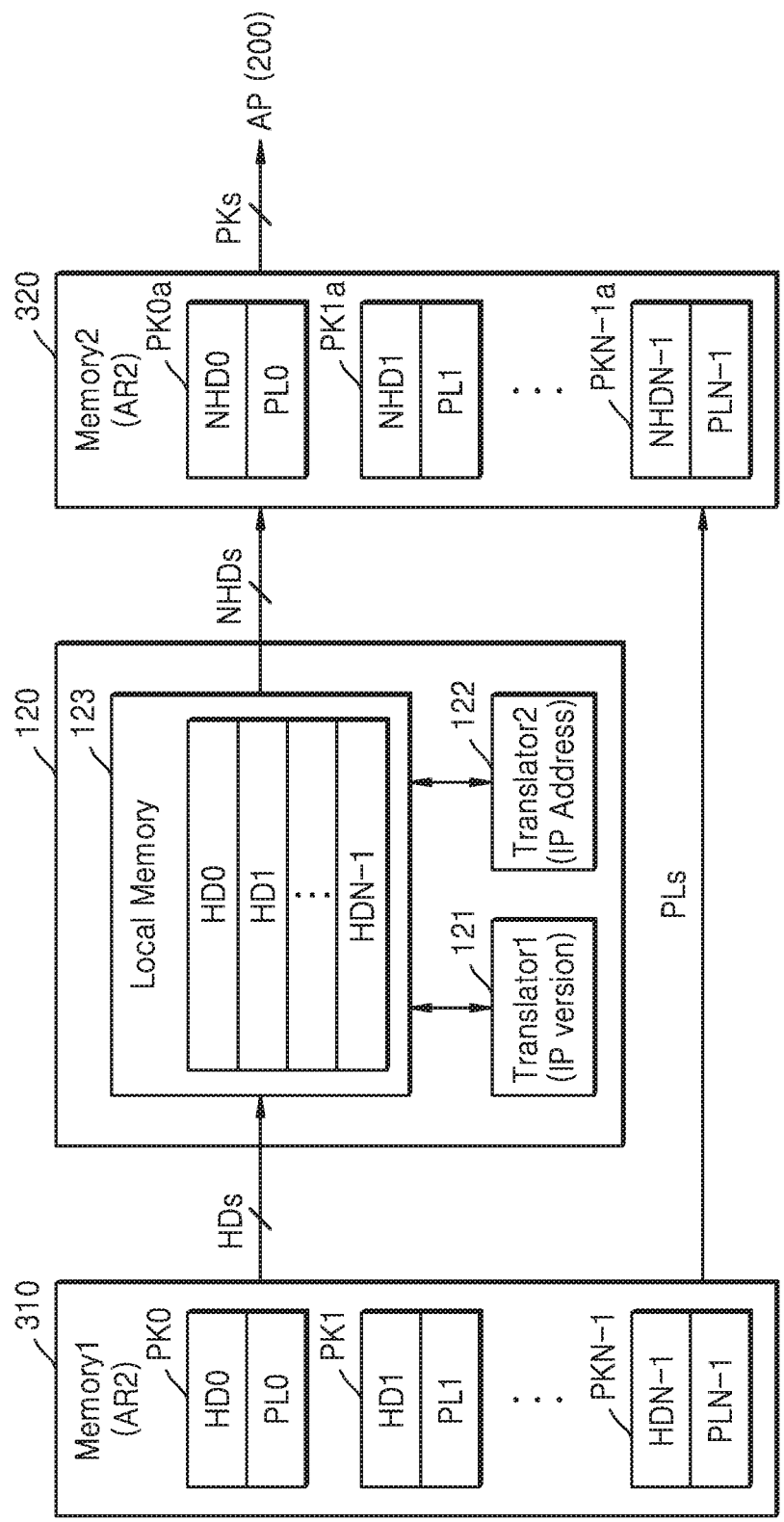
FIG. 2 is a diagram illustration operations of an address translation circuit according to at least one example embodiment.

FIG. 2 is a diagram illustration operations of an address translation circuit 120 according to at least one example embodiment. It is assumed that an IP packet is received from a network, that is, the address translation circuit 120 is a receiving path.

Referring to FIG. 2, the address translation circuit 120 may include a first translator 121, a second translator 122, and/or a local memory 123, but is not limited thereto.

An IP packet transmitted and received via the network may include a header and a payload, etc. For example, a first IP packet PK0 may include a first header HD0 and a first payload PL0. The header may include a network address (hereinafter, referred to as an IP address) and control information, and the payload may include data.

IP packets PK0 to PKN−1 received through the network may be stored in a first memory 310, where N is a natural number. For example, the first memory 310 may be the first area AR1 of the memory 300 of FIG. 1, that is, the dedicated area of the communication processor 100, etc.

Headers HDs of the IP packets PK1 to PKN−1 stored in the first memory 310 may be read, and the read headers HDs may be stored in the local memory 123. In at least one example embodiment, the address translation circuit 120 may read the headers HDs from the first memory 310 and store the headers HDs in the local memory 123 in, for example, a direct memory access (DMA) manner based on address and length information of the headers HDs, which are obtained based on descriptor information indicating positions at which the IP packets PK0 to PKN−1 are stored in the first memory 310.

The local memory 123 may be embodied by SRAM or a register. However, the example embodiments of the inventive concepts are not limited thereto, and the local memory 123 may be embodied by various kinds of memories. The local memory 123 may also be referred to as a local buffer. Although FIG. 2 illustrates an example in which the local memory 123 is included in the address translation circuit 120, the example embodiments of the inventive concepts are not limited thereto. In another example embodiment, the local memory 123 may be an embedded memory of the communication processor (refer to 100 in FIG. 1) and also, a memory provided separately from the address translation circuit 120.

The first translator 121 and the second translator 122 may access the local memory 123 and translate IP addresses of headers HD0 to HDN−1 stored in the local memory 123. The first translator 121 may operate as a pre-processor, while the second translator 122 may operate as a post-processor. The first translator 121 may operate before the second translator 122, and the second translator 122 may operate after an operation of the first translator 121 is completed.

The first translator 121 may change (and/or translate, generate a new header, etc.) a header format of the IP packet and change an IP version of the IP packet. The first translator 121 may read headers HD0 to HDN−1 from the local memory 123 and determine whether, for example, a change of an IP version of each of the headers HD0 to HDN−1 is desired and/or necessary. When the change of the IP version is desired and/or necessary, the first translator 121 may translate the formats of the headers HD0 to HDN−1 into formats, for example, by changing the format of the headers into another IP version (e.g., another IP protocol version, such as IPv4, IPv6, etc.), and change the IP version into another IP version. Headers may include various fields (e.g., a plurality of fields), and when a header format is changed, the first translator 121 may change at least some of the fields of the header.

In at least one example embodiment, the first translator 121 may support a CLAT function and translate an Internet protocol version 4 (IPv4) header format included in the header of the IP packet into an Internet protocol version 6 (IPv6) header format and/or translate an IPv6 header format into an IPv4 header format. The changed headers may be stored again in the local memory 123. For example, when the network supports an IPv6 address system and a host (e.g., the application program 202 in FIG. 1, etc.) using data of the IP packet received through the network supports an IPv4 address, the first translator 121 may translate an IPv6 address included in the header of the IP packet into an IPv4 address.

The second translator 122 may perform an IP address translation. The second translator 122 may read headers, e.g., HD0 to HDN-1 (or headers changed by the first translator 121), from the local memory 123 and determine whether a translation of an IP address of each of the headers HD0 to HDN-1 is desired and/or necessary. When the translation of the IP address of each of the headers HD0 to HDN-1 is desired and/or necessary, the second translator 122 may change the address values (e.g., values indicating a source address and/or a destination address) and a port number of a transmission protocol (e.g., a port number of a transmission control protocol (TCP) or a user datagram protocol (UDP), etc.) from among the IP address.

In at least one example embodiment, the second translator 122 may support a NAT function and translate a public IP address into a private IP address and/or translate a private IP address into a public IP address. For example, when the communication device 10 performs tethering and/or operates as a router, the second translator 122 may translate a public IP address of the IP packet received through the network into a private IP address. The changed headers may be stored again in the local memory 123.

The headers HD0 to HDN-1 may be changed by changing (e.g., translating, generating a new header, etc.) the IP version of the first translator 121 and/or by changing the IP address value of the second translator 122, and the changed headers (e.g., NHD0 to NHDN-1 (or NHDs)) may be stored in (and/or copied to) the second memory 320. For instance, the second memory 320 may be a shared area between the second area AR2 (i.e., the common processor 100, etc.) of the memory 300 of FIG. 1 and the application processor 200. In at least one example embodiment, the changed headers NHDs may be read from the local memory 123 in, for example, a DMA manner, and stored in the second memory 320. Meanwhile, payloads (e.g., PL0 to PLN-1 (or PLs)) of the IP packets PK0 to PKN-1 may be read from the first memory 310 in a DMA manner and stored in the second memory 320. Accordingly, IP packets PK0a to PKN-1a having translated IP addresses may be stored in the second memory 320. The application processor 200 may access the second memory 320 and process IP packets PK0a to PKN-1a having translated addresses.

Although at least one example embodiment has been described which assumes that the address translation circuit 120 is the receiving path, operations of the first translator 121 and the second translator 122 when the address translation circuit 120 is a transmission path may be similar to the above-described operations of the first translator 121 and the second translator 122. However, when the address translation circuit 120 is the transmission path, headers of IP packets stored in the second memory 320 by the application processor 200 may be read from the second memory 320 and stored in the local memory 123, and the first translator 121 and the second translator 122 may change IP addresses respectively included in the headers. In this case, the second translator 122 may operate as a pre-processor. After the operation of the second translator 122 is completed, the first translator 121 may operate as a post-processor. After IP packets having the translated addresses are stored in the first memory 310, the IP packets may be transmitted to other devices through the network.

Figure 3:
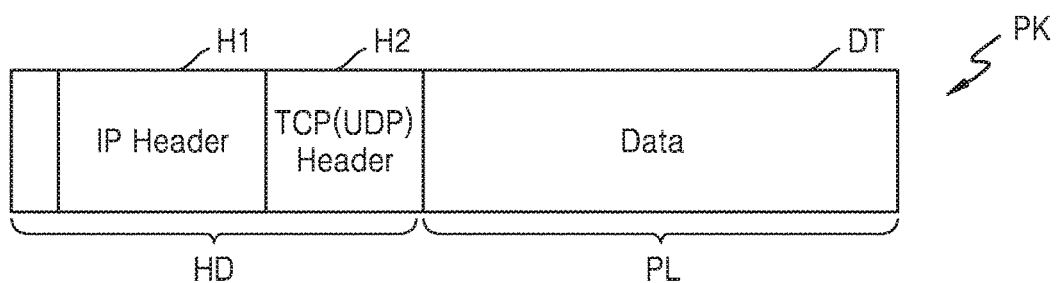
FIG. 3 is a diagram of a structure of an Internet protocol (IP) packet according to at least one example embodiment.

FIG. 3 is a diagram of a structure of an IP packet PK according to at least one example embodiment.

Referring to FIG. 3, according to at least one example embodiment, the IP packet PK may include a header HD and/or a payload PL, etc., but is not limited thereto. The header HD may include an IP header H1 and/or a TCP header H2 (or an UDP header, etc.), and the payload PL may include data DT, which is provided to an application program and/or generated by the application program. In FIG. 2, the IP header H1 and the TCP header H2 of the IP packet PK may be stored in the local memory 123. The first translator 121 may change the IP header H1 to change an IP version, and the IP header H1 and the TCP header H2 may be changed so that the second translator 122 may translate an IP address.

Figure 4A:
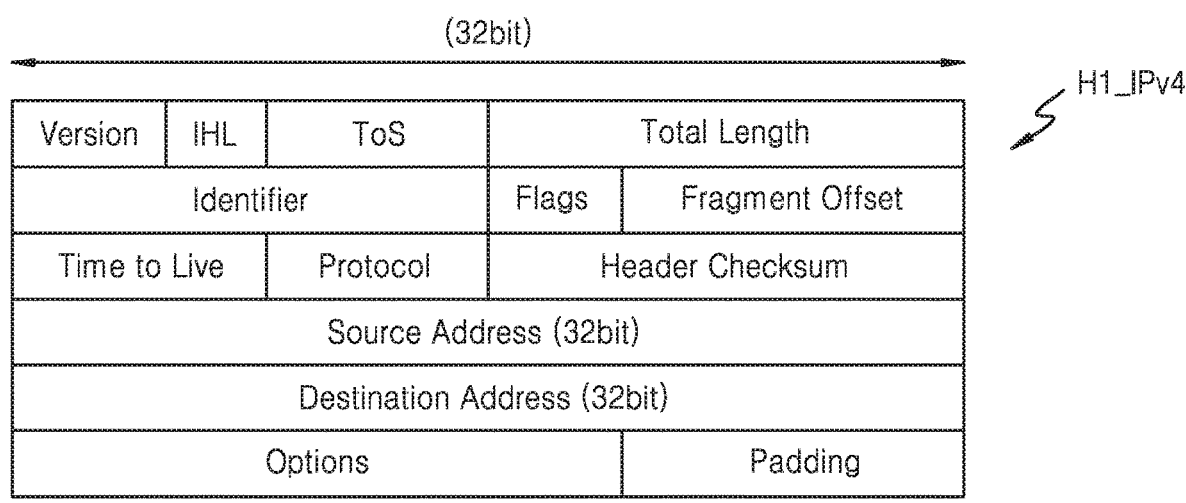
FIGS. 4A and 4B illustrate IP headers of IP packets according to some example embodiments.
Figure 4B:
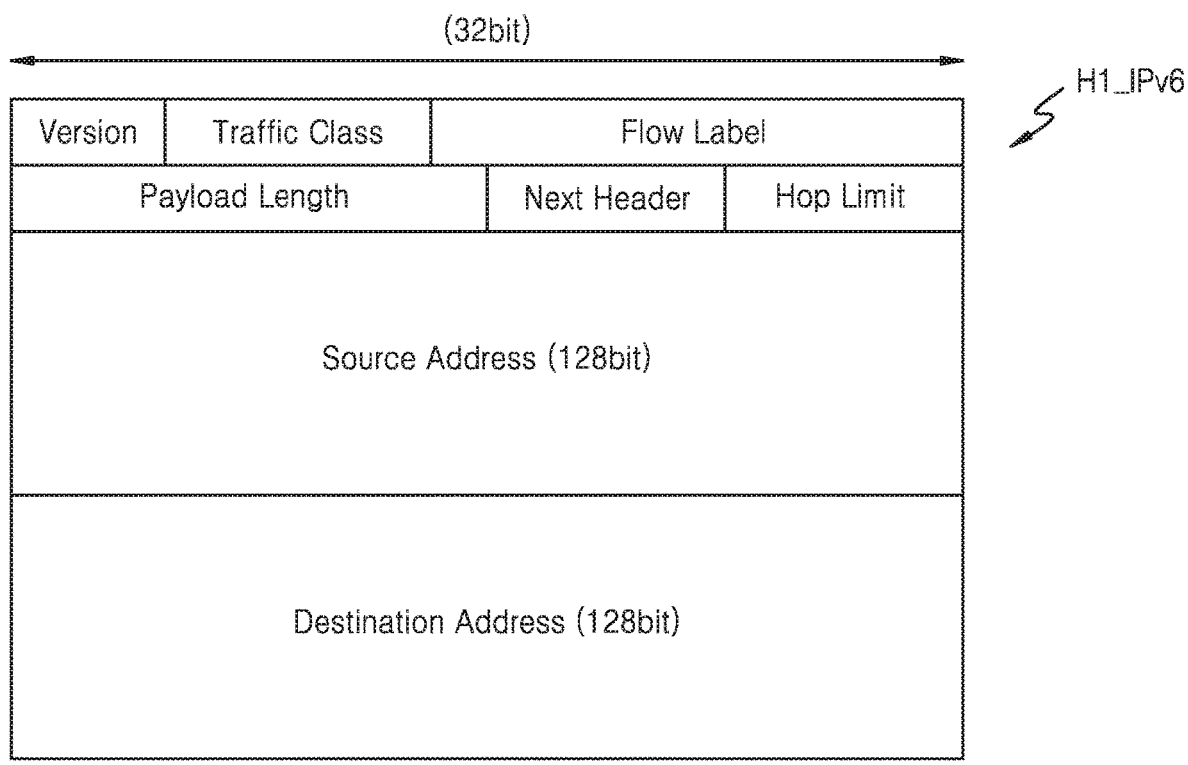

FIGS. 4A and 4B illustrate IP headers of IP packets according some example embodiments. FIG. 4A illustrates a header of an IPv4 packet, and FIG. 4B illustrates a basic header of an IPv6 packet.

Referring to FIG. 4A, a header H1_IPv4 of an IPv4 packet (hereinafter, referred to as an IPv4 header) may include respective fields for a version, an IP header length IHL, a service type ToS, a total length, an identifier, flags, a fragment offset, a time-to-live, a protocol, a header checksum, a source address, a destination address, options, and a padding, but is not limited thereto. Each of the source address and the destination address may have a length of 32 bits, but is not limited thereto, and lengths of the options and the padding may be variable.

Referring to FIG. 4B, a basic header H1_IPv6 of an IPv6 packet (hereinafter, referred to as an IPv6 header) may include respective fields for a version, a traffic class, a flow label, a payload length, a next header, a hop limit, a source address, and a destination address, but is not limited thereto. Each of the source address and the destination address may have a length of 128 bits, but is not limited thereto.

Referring to FIGS. 4A and 4B, the IPv4 header H1_IPv4 may include twelve basic fields, and the IPv6 header H1_IPv6 may include eight basic fields, but are not limited thereto. However, the IPv6 packet may further include an extension header in addition to the basic header (i.e., the IPv6 header H1_IPv6). In the IPv6 header H1_IPv6, a next header field may refer to a type of a next header, etc. A header that may be indicated in the next header may be an IPv6 extension header or a TCP (or UDP, etc.) header, which is an upper-layer header. When an extension header is not used, the TCP (or UDP, etc.) header may be located in the next header.

The IPv4 header H1_IPv4 and the IPv6 header H1_IPv6 may equally include the fields for the version, the source address, and the destination address, etc. However, as described above, the length (i.e., 128 bits) of each of the source address and the destination address of the IPv6 header H1_IPv6 may be four times the length (i.e., 32 bits) of each of the source address and the destination address of the IPv4 header H1_IPv4.

When the IPv4 header H1_IPv4 is translated into the IPv6 header H1_IPv6, the fields for the IP header length IHL, the identifier, the flags, the fragment offset, the header checksum, the options, and the padding, etc., included in the IPv4 header H1_IPv4 may be deleted, and the field for the flow label may be added. Conversely, when the IPv6 header H1_IPv6 is translated into the IPv4 header H1_IPv4, the field for the flow label may be deleted, and the fields for the IP header length IHL, the identifier, the flags, the fragment offset, the header checksum, the options, and the padding, etc., may be added. The fields for the service type ToS, the total length, the protocol, the time-to-live of the IPv4 header H1_IPv4 and the fields for the traffic class, the payload length, the next header, and the hop limit of the IPv6 header H1_IPv6 may be translated into each other.

The first translator 121 of the address translation circuit 120 described with reference to FIG. 2 may translate the IPv4 header H1_IPV4 into the IPv6 header H1_IPV6 or translate the IPv6 header H1_IPV6 into the IPv4 header H1_IPV4.

Figure 5:
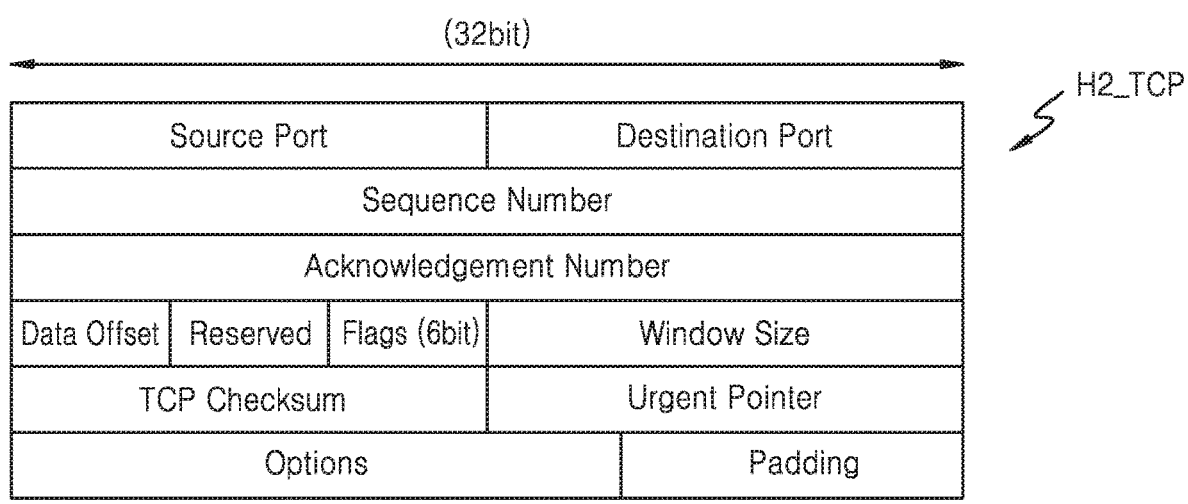
FIG. 5 illustrates a transmission control protocol (TCP) header of an IP packet according to at least one example embodiment.

FIG. 5 illustrates a TCP header of an IP packet according to at least one example embodiment.

Referring to FIG. 5, a TCP header H2_TCP may include respective fields for a source port, a destination port, a sequence number, an acknowledgement number, a data offset, a reserved field 'Reserved', 6-bit flags, a window size, a TCP checksum, an urgent pointer, options, and/or a padding, etc. Similar to the TCP header H2_TCP, an UDP header, which is a transmission protocol, may include respective fields for a source port, a destination port, a UDP length, and/or a UDP checksum, etc.

The second translator 122 of the address translation circuit 120 described with reference to FIG. 2 may change a source and/or destination address value of the IP headers (e.g., the IPv4 header H1_IPv4 or the IPv6 header H1_IPv6) of FIGS. 4A and 4B and a source and/or destination port number of the TCP header H2_TCP (or the UDP header, etc.) and translate a private IP address into a public IP address and/or conversely translate the public IP address into the private IP address.

Figure 6A:
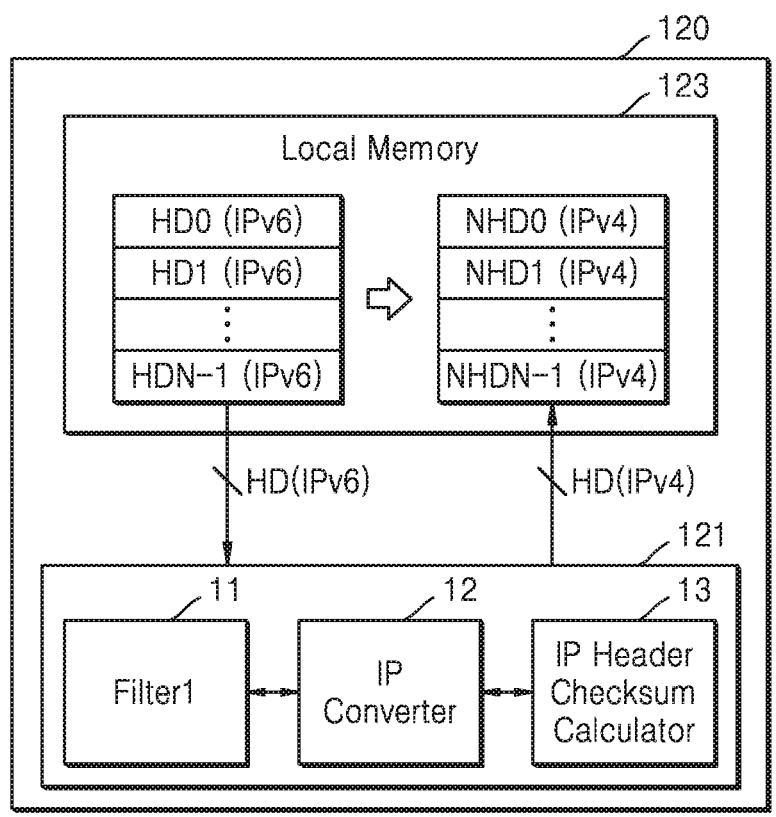
FIG. 6A is a block diagram of an embodied example of a first translator of an address translation circuit according to at least one example embodiment.
Figure 6B:
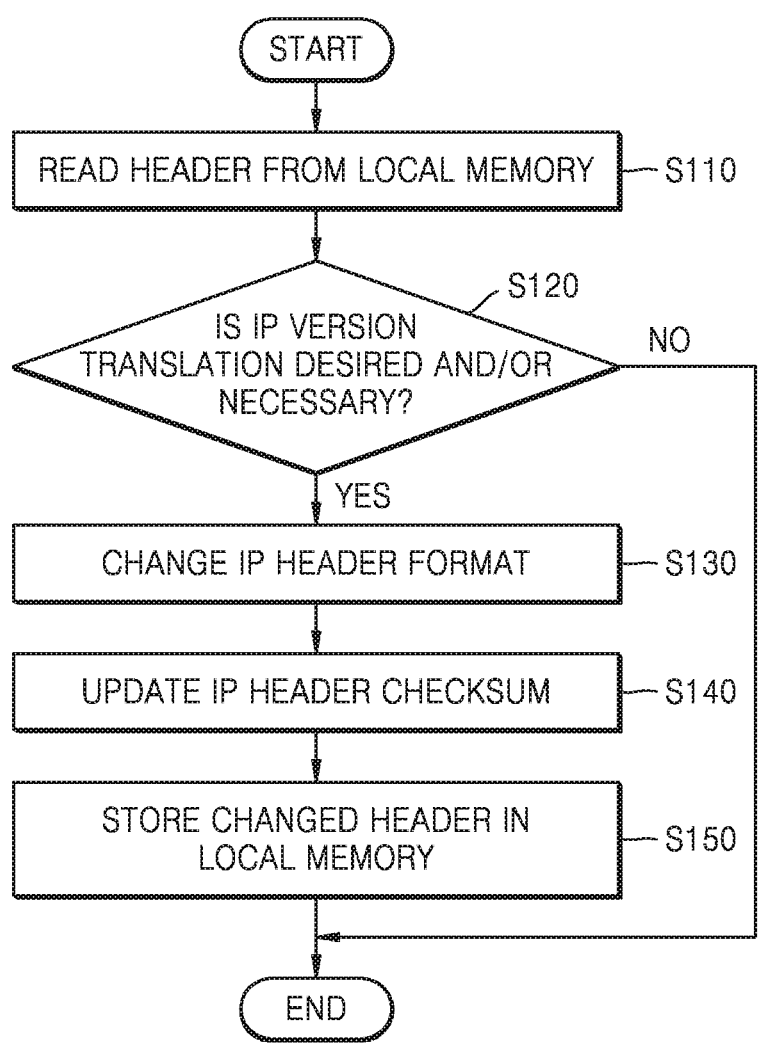
FIG. 6B is a block diagram of a method of operating the first translator of FIG. 6A according to at least one example embodiment.

FIG. 6A is a block diagram of an embodied example of a first translator 121 of an address translation circuit according to at least one example embodiment, and FIG. 6B is a flowchart of a method of operating the first translator 121 of FIG. 6A at least one example embodiment. A case in which the first translator 121 translates an IPv6 header into an IPv4 header will be described as an example.

Referring to FIG. 6A, the first translator 121 may include a first filter 11, an IP converter 12, and/or a first IP header checksum calculator 13, etc. In at least one example embodiment, the first filter 11, the IP converter 12, and/or the IP header checksum calculator 13 of the first translator 121 may be embodied by hardware logic circuits, but is not limited thereto.

Referring to FIGS. 6A and 6B, the first translator 121 may read header HD stored in a local memory 123 (S110). The first translator 121 may sequentially read headers HD0 to HDN−1. As described above with reference to FIG. 3, the header HD may include an IP header H1 and a TCP header H2. In operation S110, the first translator 121 may read the IP header H1 from the local memory 123. The first translator 121 may perform a header format translation on the read header HD.

The first filter 11 may analyze the read header HD and determine whether an IP version translation is desired and/or necessary (S120). The first filter 11 may determine an IP version of the header HD based on desired and/or predetermined filter sets, for example, desired and/or preset fields, and determine whether a change of a header format of the header HD is desired and/or necessary. For example, the first filter 11 may confirm a version field of the header HD and determine that the header HD is the IPv6 header. The first filter 11 may determine whether the IPv6 header is to be translated into an IPv4 header based on different desired and/or preset fields, for example, a traffic class and/or a destination address, etc. For example, if it is determined based on the destination address that an IP packet is provided to an application that is configured to support IPv4, the first filter 11 may determine that a translation of the header format of the header HD is desired and/or necessary.

If the first filter 11 determines that the IP version translation is desired and/or necessary, the IP converter 12 may change an IP header format of the header HD (S130). To change the IP header format, the IP converter 12 may select fields to be changed and change the selected fields. The IP converter 12 may perform an IP header format translation based on methods, such as stateless Internet protocol/Internet control message protocol (IP/ICMP) translation (SSIT), network address translation-protocol translation (NAT-PT), and/or bump-in-the-stack (BIS), etc.

Subsequently, the IP header checksum calculator 13 may update an IP header checksum (S140). In operation S130, since the IP header format is changed, the first IP header checksum calculator 13 may calculate an IP header checksum based on the IP header H1 having the changed format and update the IP header checksum based on the calculated value.

For example, when the IPv6 header is translated into the IPv4 header, the first IP header checksum calculator 13 may calculate the IP header checksum and provide the calculated value to a header checksum field of the IPv4 header. Thus, the IP header checksum may be updated, and an IP header format translation, that is, the IP version translation, may be completed.

The first translator 121 may store a header NHD having the changed header format in the local memory 123 (S150). For example, the first translator 121 may store a header NHD, which is translated from the IPv6 header into the IPv4 header in the local memory 123.

In operation S 120, if the first filter 11 determines that the IP version translation is undesired and/or unnecessary, the header format translation on the header HD may be ended. The header format translation including the above-described operations S110 to S150 may be sequentially performed on the headers HD0 to HDN−1 stored in the local memory 123. Although FIG. 6A illustrates a case in which IPv6 headers HD0 to HDN−1 of the local memory 123 are translated to the memory interface 160 of FIG. 11, the example embodiments of the inventive concepts are not limited thereto. As described above, the headers HD0 to HDN−1 may be translated as needed, and some of the headers HD0 to HDN−1 may not be translated.

The translated headers HD0 to HDN−1 stored in the local memory 123 may be copied to the first memory (refer to 310 in FIG. 2) and/or the second memory (refer to 320 in FIG. 2) in a DMA manner. Additionally, an IP address translation may be performed on the translated headers HD0 to HDN−1 by the second translator (refer to 122 in FIG. 2).

Figure 7A:
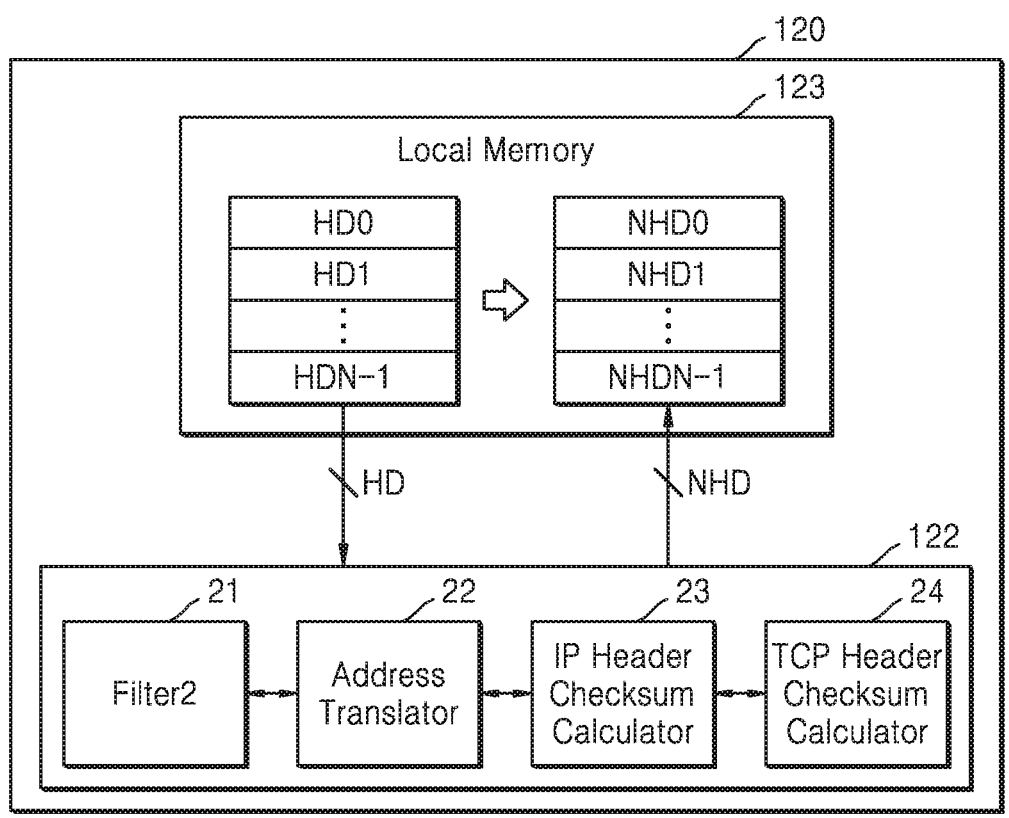
FIG. 7A is a block diagram of an example of a second translator of an address translation circuit according to at least one example embodiment.
Figure 7B:
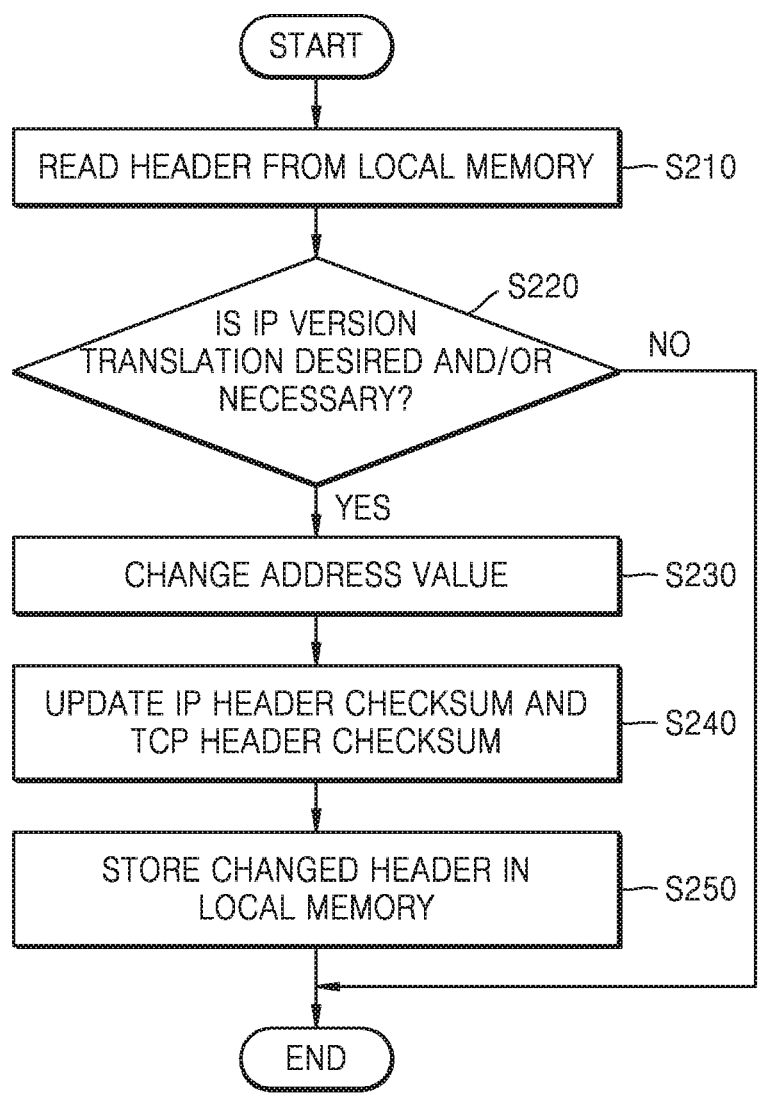
FIG. 7B is a flowchart of a method of operating the second translator of FIG. 7A according to at least one example embodiment.

FIG. 7A is a flowchart of an embodied example of a second translator 122 of an address translation circuit according to at least one example embodiment, and FIG. 7B is a flowchart of a method of operating the second translator 122 of FIG. 7A according to at least one example embodiment.

Referring to FIG. 7A, the second translator 122 may include a second filter 21, an address translator 22, an IP header checksum calculator 23, and/or a TCP header checksum calculator 24, etc., but is not limited thereto. The second filter 21, the address translator 22, the IP header checksum calculator 23, and the TCP header checksum calculator 24 may be embodied using hardware logic circuits, but is not limited thereto. In at least one example embodiment, the IP header checksum calculator 23 and the TCP header checksum calculator 24 may be embodied by one header checksum calculating circuit, but is not limited thereto.

Referring to FIGS. 7A and 7B, the second translator 122 may read a header HD stored in a local memory 123 (S210). The second translator 122 may sequentially read headers HD0 to HDN−1. As described above with reference to FIG. 3A, the header HD may include an IP header H1 and a TCP header H2, etc. In operation S210, the second translator 122 may read an IP header H1 and a TCP header H2, etc., from the local memory 123.

The second translator 122 may perform operations described below and translate an IP address included in the read header HD. The second translator 122 may translate a public IP address of an IP packet received through a network into a private IP address and/or translate a private IP address of an IP packet to be transmitted through the network (i.e., an IP packet provided by an AP) into a public IP address used for the network.

The second filter 21 may analyze the read header HD and determine whether an IP address translation (for example, a translation of an address value, etc.) is desired and/or necessary (S220). The second filter 21 may filter the header HD based on a desired and/or predetermined filter set and determine whether the IP address translation is desired and/or necessary. In at least one example embodiment, a source address and/or a destination address of the IP address may be included in the filter set. For example, when the source address of the IP packet to be transmitted through the network is not included in a public IP address area (e.g., IP address range and/or subnet mask) used for the network, the second filter 21 may determine that the IP address translation is desired and/or necessary. In another example, when a destination address of the IP packet received through the network is not included in a local IP address area (e.g., IP address range and/or subnet mask) provided by the communication device 10 of FIG. 1, the second filter 21 may determine that the IP address translation is desired and/or necessary.

If the second filter 21 determines that the IP address translation is desired and/or necessary, the address translator 22 may change an address value and a port number included in the header HD (S230). As described with reference to FIGS. 4A to 5, the address value may be included in fields for a source address and/or a destination address of an IP header (e.g., the IPv4 header H1_IPv4 of FIG. 4A or the IPv6 header H1_IPv6 of FIG. 4B), and the port number may be included in fields for a source port or a destination port of a TCP header or UDP header, for example, the TCP header H2_TCP of FIG. 5. The address translator 22 may change a source address value and a source port number and/or change a destination address value and a destination port number. Thus, the address translator 22 may translate a public IP address into a private IP address and/or translate a private IP address a public IP address. The address translator 22 may store a relation between an IP address and a translated IP address, namely, a relationship between the private IP address and the public IP address, in a translation table.

FIG. 8 illustrates a translation table TT according to at least one example embodiment.

Referring to FIG. 8, the translation table TT may include a public IP address PUA and a private IP address PRA, which may correspond to each other. For example, a private IP address PRA having an address value '10.0.0.2' and a port number '3327' may correspond to a public IP address PUA having an address value '135.26.32.7' and a port number '5003.' A private IP address PRA having an address value '10.0.0.3' and a port number '3327' may correspond to a public IP address PUA having an address value '135.26.32.7' and a port number '5002.' The address translator 22 may generate and use the translation table TT during an IP address translation.

Referring back to FIGS. 7A and 7B, the IP header checksum calculator 23 may update an IP header checksum, and the TCP header checksum calculator 24 may update a TCP header checksum (or an UDP header checksum, etc.) (S240). However, when the header HD is the IPv6 header, the updating of the IP header checksum may not be performed.

In operation S230, since the address value is changed, the IP header checksum calculator 23 may calculate the IP header checksum based on the IP header including the changed address value and update the IP header checksum based on the calculated value. Also, in operation S230, since the port number is changed, the TCP header checksum calculator 24 may calculate the TCP header checksum based on the TCP header including the changed port number and update the TCP header checksum based on the calculated value. Thus, the IP translation may be completed.

The second translator 122 may store a header NHD having a changed IP address value in the local memory 123 (S250). For example, the second translator 122 may store a header NHD of which the IP address value is changed from a public IP address to a private IP address or a header NHD of which the IP address value is conversely changed from the private IP address to the public IP address in the local memory 123 again.

Meanwhile, in operation S220, if the second filter 21 determines that the IP address translation is undesired and/or unnecessary, an IP address translation on the header HD may be ended. The IP address translation (i.e., a header translation) including the above-described operations S210 to S250 may be sequentially performed (or performed in parallel) on the headers HD0 to HDN−1 stored in the local memory 123. Although FIG. 7A illustrates a case in which the headers HD0 to HDN−1 of the local memory 123 are translated into new headers HD0 to NDN−1 having translated IP addresses, the example embodiments of the inventive concepts are not limited thereto. As described above, the headers HD0 to HDN−1 may be translated as needed, and some of the headers HD0 to HDN−1 may not be translated.

The headers HD0 to HDN−1 stored in the local memory 123 may be stored in the first memory (refer to 310 in FIG. 2) and/or the second memory (refer to 320 in FIG. 2) and/or a header format translation may be performed on the headers HD0 to HDN−1 stored in the local memory 123 by the first translator (refer to 121 in FIG. 1).

Figure 9A:
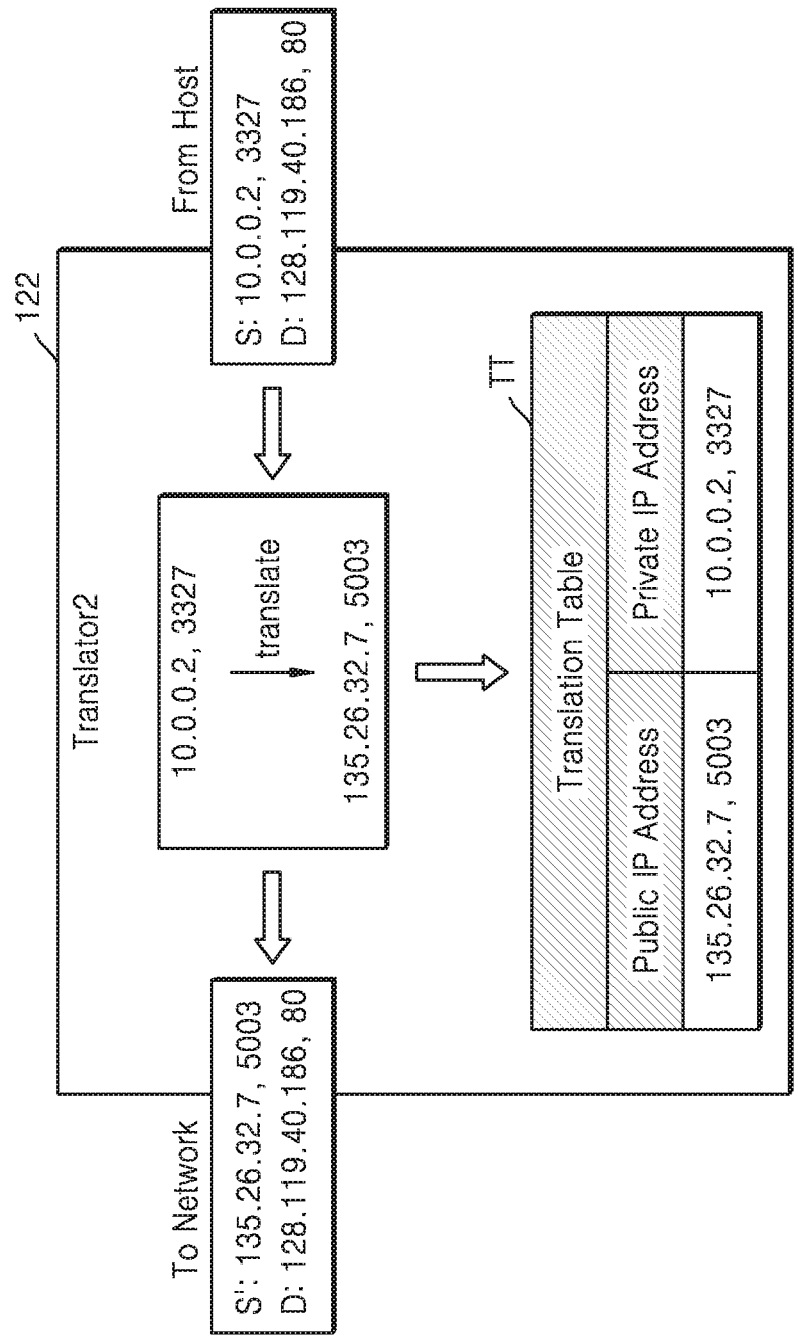
FIGS. 9A and 9B are diagrams illustrating a method of translating an IP address of a second translator according to at least one example embodiment.
Figure 9B:
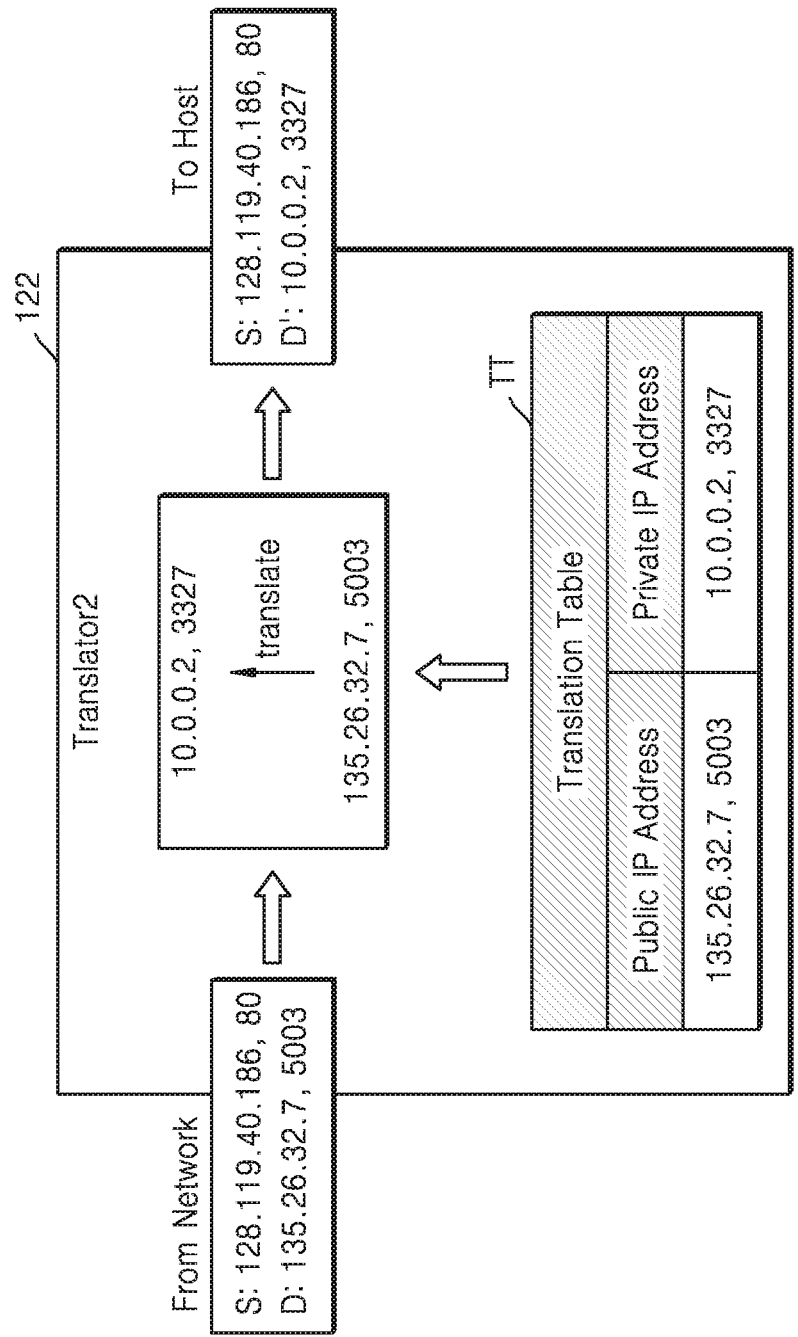

FIGS. 9A and 9B are diagrams illustrating a method of translating an IP address of a second translator according to some example embodiments. FIG. 9A illustrates the translation of a private IP address into a public IP address in a transmission path, and FIG. 9B illustrates the translation of a received public IP address into a private IP address in a receiving path.

Referring to FIG. 9A, a source IP address S of an IP packet received from a host may be a private IP address having an address value '10.0.0.2' and a port number '3327,' and a destination IP address D may be a public IP address having an address value of '128.119.40.186' and a port number of '80.' When the source IP address S does not correspond to a public IP address area (e.g., IP address range and/or subnet mask) provided by a particular network, the second translator 122, for example, the address translator (refer to 22 in FIG. 7A) of the second translator 122, may perform an IP address translation operation of translating the source IP address S into the public IP address.

The second translator 122 may change the address value '10.0.0.2' and the port number '3327' of the source IP address S into an address value '135.26.32.7' and a port number '5003,' respectively, and translate the source IP address S into the public IP address. The private IP address and the public IP address corresponding thereto may be stored in a translation table TT. An IP packet having a translated source IP address S' and the destination IP address D may be transmitted through the network to a destination (e.g., a server or another electronic device, etc.).

Referring to FIG. 9B, a source IP address S of an IP packet received from the network may be a public IP address having an address value '128.119.40.186' and a port number '80', and a destination IP address D may be a public IP address having an address value '135.26.32.7' and a port number '5003.' When a destination IP address D does not correspond to a private IP address area (e.g., IP address range and/or subnet mask) provided by a local network, the second translator 122 may perform an IP address translation operation of translating the public IP address into a private IP address.

The second translator 122 may change the address value '135.26.32.7' and the port number '5003' of the destination IP address D into an address value '10.0.0.2' and a port number '3327,' respectively, with reference to the translation table TT and translate the destination IP address D into a source IP address. An IP packet having a translated destination IP address D' and the source IP address S may be transmitted to the host.

Figure 10:
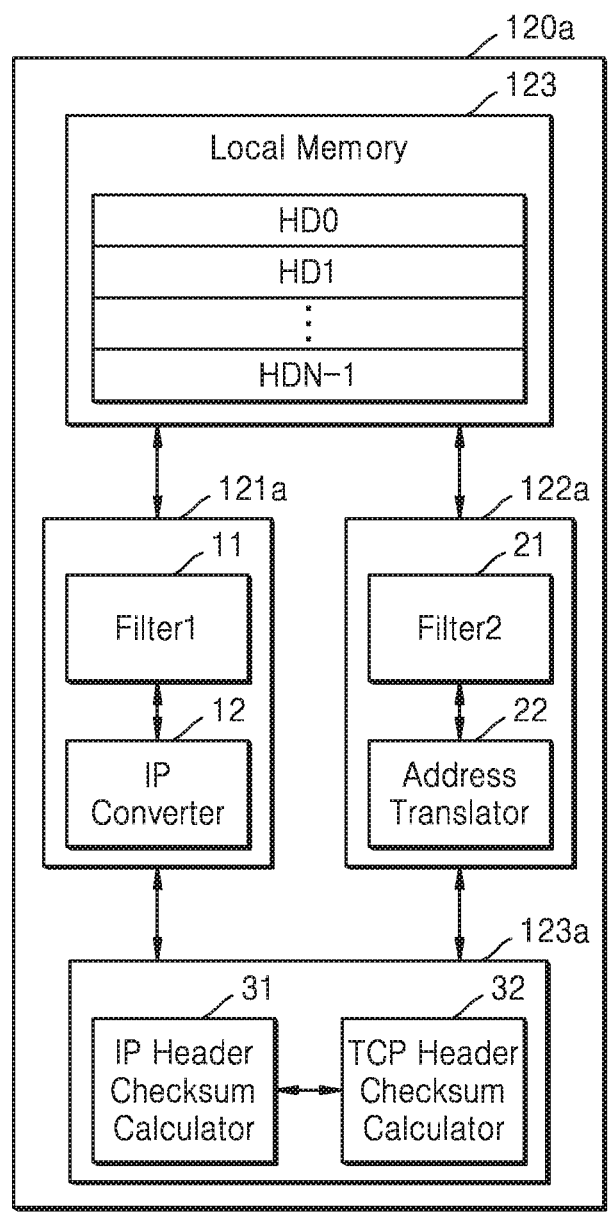
FIG. 10 is a block diagram of an address translation circuit according to at least one example embodiment.

FIG. 10 is a block diagram of an address translation circuit 120a according to at least one example embodiment.

Referring to FIG. 10, the address translation circuit 120a may include a local memory 123, a first translator 121a, a second translator 122a, and/or a header checksum calculator 123a, etc., but is not limited thereto.

The first translator 121a may include a first filter 11 and/or an IP converter 12, etc. Operations of the first filter 11 and the IP converter 12 of the first translator 121a may be the same as the operations of the first filter 11 and the IP converter 12 of FIG. 6A. Also, the second translator 122a may include a second filter 21 and/or an address translator 22, etc. Operations of the second filter 21 and the address translator 22 of the second translator 122a may be the same as operations of the second filter 21 and the address translator 22 of FIG. 7A.

The header checksum calculator 123a may update a header checksum when the first translator 121a translates a format of an IP header and/or when the second translator 122a translates an IP address.

The header checksum calculator 123a may include an IP header checksum calculator 31 and/or a TCP header checksum calculator 32, etc. When the first translator 121a translates the format of the IP header, the IP header checksum calculator 31 may calculate an IP header checksum based on the translated IP header of the format and update a TCP header checksum.

Furthermore, when the second translator 122a translates the IP address, the IP header checksum calculator 31 may update the IP header checksum based on an IP header including a changed address value, and the TCP header checksum calculator 32 may calculate the TCP header checksum based on a TCP header including a changed port number and update the TCP header checksum.

In at least one example embodiment, each of the first translator 121a and the second translator 122a of the address translation circuit 120a may not include a header checksum calculator, but an additional header checksum calculator 123a may calculate a header checksum during the header format translation of the first translator 121a and during the IP address translation of the second translator 122a, but the example embodiments are not limited thereto.

Figure 11:
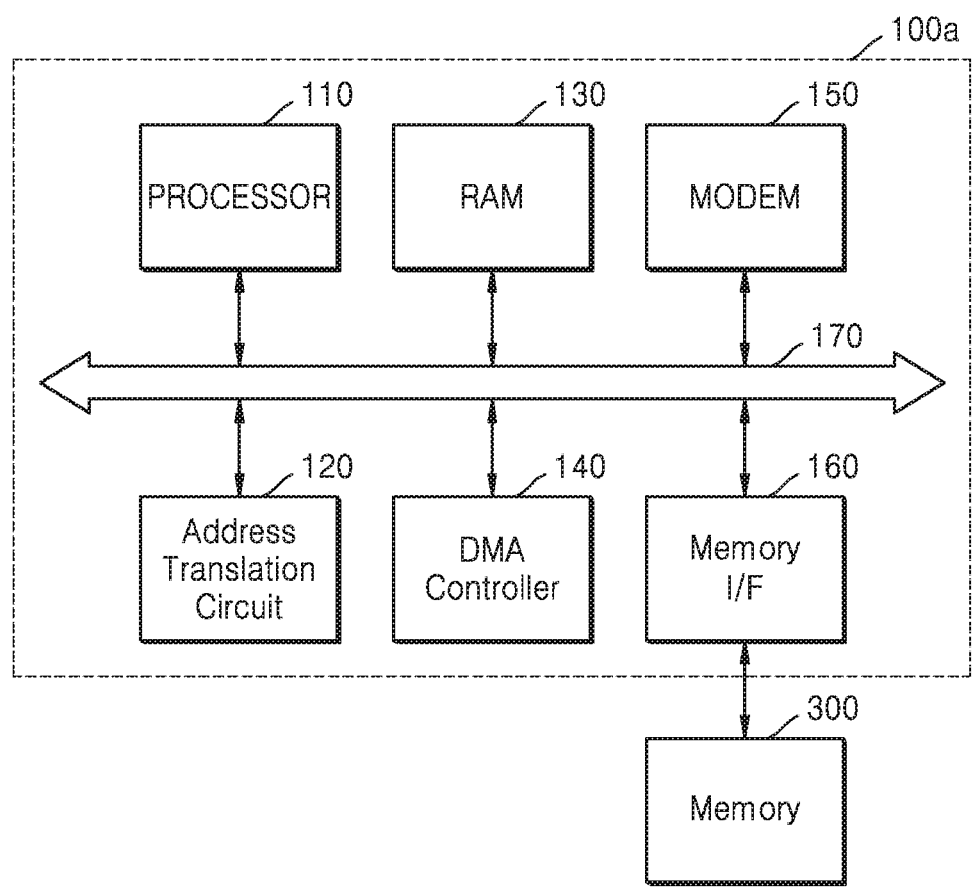
FIG. 11 is a block diagram of a communication processor according to at least one example embodiment.

FIG. 11 is a block diagram of a communication processor 100a according to at least one example embodiment.

Referring to FIG. 11, the communication processor 100a may include at least one processor 110, RAM 130, a modem 150, an address translation circuit 120, a DMA controller 140, and/or a memory interface 160, etc., but the example embodiments are not limited thereto. In addition, the communication processor 100a may further include other components. In at least one example embodiment, the communication processor 100a may be embodied by a single chipset, but is not limited thereto. The components of the communication processor 100a may transmit and receive data through a bus 170.

The processor 110 may control all operations of the communication processor 100a and be embodied by a central processing unit (CPU), a microprocessor (MP), or a digital signal processor (DSP), etc. In at least one example embodiment, the processor 110 may be embodied by a multi-core processor, for example, a dual-core processor or a quad-core processor, or may be a multi-processor.

The RAM 130 may be used as an operating memory, a buffer memory, and/or a cache memory, etc. For example, software or firmware for controlling the communication processor 100a may be loaded to the RAM 130. The RAM 130 may be embodied by a volatile memory, such as DRAM and SRAM, etc., and/or a resistive memory, such as PRAM, MRAM, FeRAM, and ReRAM, etc.

The modem 150 may translate an IP packet into a signal suitable for transmission through a network and/or translate a signal received through the network into an IP packet. The modem 150 may encode and modulate the IP packet and translate the IP packet into a transmission signal. Also, the modem 150 may demodulate and decode a receiving signal received through the network and translate the receiving signal into the IP packet. The modem 150 may amplify and filter a signal and communicate with an RF chip configured to convert a frequency of the signal. The RF chip may transmit the transmission signal to the network and/or receive the receiving signal from the network through an antenna.

The memory interface 160 may transmit data to a memory 300 and/or read data from the memory 300 via the control of the processor 110 and/or the DMA controller 140, but is not limited thereto.

The memory 300 may be embodied by a different device (e.g., a memory chip or a memory module, etc.) from the communication processor (e.g., a communication chip) 100a. However, the example embodiments of the inventive concepts are not limited thereto. In at least one example embodiment, the memory 300 may be an embedded memory of the communication processor 100a. An IP packet received or to be received through the modem 150 may be stored in the memory 300. In at least one example embodiment, the communication processor 100a and the application processor (refer to 200 in FIG. 1) may access the memory 300. The memory 300 may include a dedicated area of the communication processor 100a, a shared area, and a dedicated area of the application processor 200.

The DMA controller 140 may support data transmission between the components of the communication processor 100a and control data to be directly transmitted between the components of the communication processor 100a without interference by the processor 110. In at least one example embodiment, the DMA controller 140 may transmit a header of the IP packet stored in the memory 300 to the address translation circuit 120 and/or transmit a header translated by the address translation circuit 120 to the memory 300. Also, the DMA controller 140 may transmit a payload of the IP packet among a plurality of areas of the memory 300, for example, the dedicated area of the communication processor 100a, the shared area, and the dedicated area of the application processor 200.

The address translation circuit 120 may translate a network address of the IP packet that is transmitted and received through the network. The address translation circuits 120 and 120a described with reference to FIGS. 2 and 10 may be applied to the communication processor 100a.

The address translation circuit 120 may receive headers of IP packets stored in the memory 300 and translate network addresses included in the headers via the control of the DMA controller 140. The address translation circuit 120 may translate a format (i.e., an IP version) of the header or perform an IP address translation.

When the address translation circuit 120 operates as a receiving path, the address translation circuit 120 may translate the format of the header and then perform the IP address translation. When the address translation circuit 120 operates as a transmission path, the address translation circuit 120 may perform the IP address translation and then translate the format of the header. The address translation circuit 120 may, via the control of the DMA controller 140, store translated headers in the shared area of the memory 300 (or a memory shared with the application processor) and/or store the translated headers in the dedicated area of the communication processor 100a. For example, when the address translation circuit 120 operates as the receiving path, the address translation circuit 120 may store the translated headers in the shared area of the memory 300 so that the application processor may use the translated headers. When the address translation circuit 120 operates as the transmission path, the address translation circuit 120 may store the translated headers in the dedicated area of the communication processor 100a, which is included in the memory 300, so that IP packets, which are provided by the application processor and include the translated headers, may be transmitted to the network through the modem 150.

As described above, the address translation circuit 120 of the communication processor 100a may translate the network address of the IP packet before the IP packet received from the network is provided to the application processor (refer to 200 in FIG. 1). Additionally, the address translation circuit 120 of the communication processor 100a may translate the network address of the IP packet before the IP packet provided by the application processor 200 is transmitted to the network.

Figure 12:
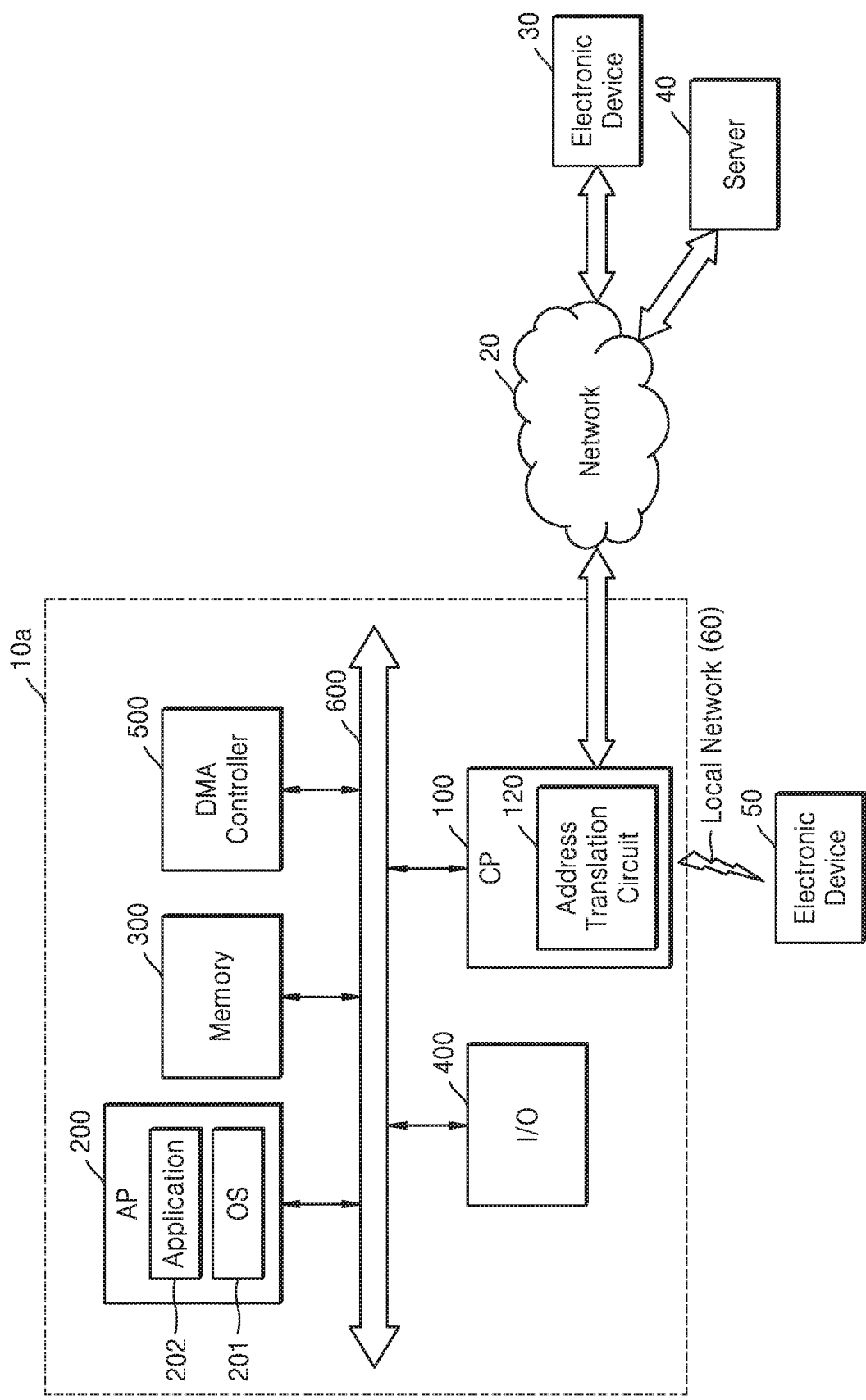
FIG. 12 is a block diagram of a communication device according to at least one example embodiment.

FIG. 12 is a block diagram of a communication device 10a according to at least one example embodiment.

Referring to FIG. 12, the communication device 10a may transmit and receive data (e.g., an IP packet) to and from at least one electronic device 30 and/or a server 40, etc., through a network (e.g., global network) 20. The communication device 10a may also operate as a router. The communication device 10a may transmit the IP packet, which is received through the network 20, to another electronic device 50 through a local network. Additionally, the communication device 10a may transmit an IP packet, which is received from the other electronic device 50, to the electronic device 30 or the server 40 through the network 20.

The communication device 10a may include a communication processor 100, an application processor 200, a memory 300, an input/output (I/O) element 400, and/or a DMA controller 500, etc., but is not limited thereto. In addition, the communication device 10a may further include other components. The components of the communication device 10a may transmit and receive data through a bus 600.

The I/O element 400 may provide a user interface and include an input unit, such as a touch pad, a keypad, and/or an input button, etc., and/or an output unit, such as a display and a speaker, etc.

The DMA controller 500 may support data transmission between the components of the communication device 10a and control data to be directly transmitted between the components of the communication device 10a without interference by the application processor 200. In at least one example embodiment, the DMA controller 500 may control the IP packet to be transmitted among the communication processor 100, the application processor 200, and the memory 300. Also, the DMA controller 500 may transmit a header of an IP packet stored in the memory 300 to an address translation circuit 120 of the communication processor 100 and/or translate a header translated by the address translation circuit 120 to the memory 300. In at least one example embodiment, each of the communication processor 100 and the application processor 200 may include a DMA controller.

A network address of the IP packet, which is received through the network 20, may be translated, and the IP packet including the translated network address may be stored in the memory 300. The communication processor 100 may translate the network address of the IP packet to conform to an address system that may be recognized by an application program 202 of the application processor 200 or the other electronic device 50. The application processor 200 may read the IP packet including the translated network address from the memory 300, and the application program 202 may process the IP packet. Additionally, the other electronic device 50 may process the IP packet including the translated network address through a local network 60.

In addition, the communication processor 100 may translate the network address of the IP packet, which is provided by the application processor 200 and/or the other electronic device 50, to conform to the address system of the network 20, and transmit the IP packet including the translated network address to the network 20.

In the communication device 10a according to at least one example embodiment, the communication processor 100 may translate the network address so that the application processor 200 may not need to perform an additional network address translation. Accordingly, the processing and/or memory load of the application processor 200 may be reduced and/or may become more efficient, and the performance of the communication device 10a is improved.

Figure 13A:
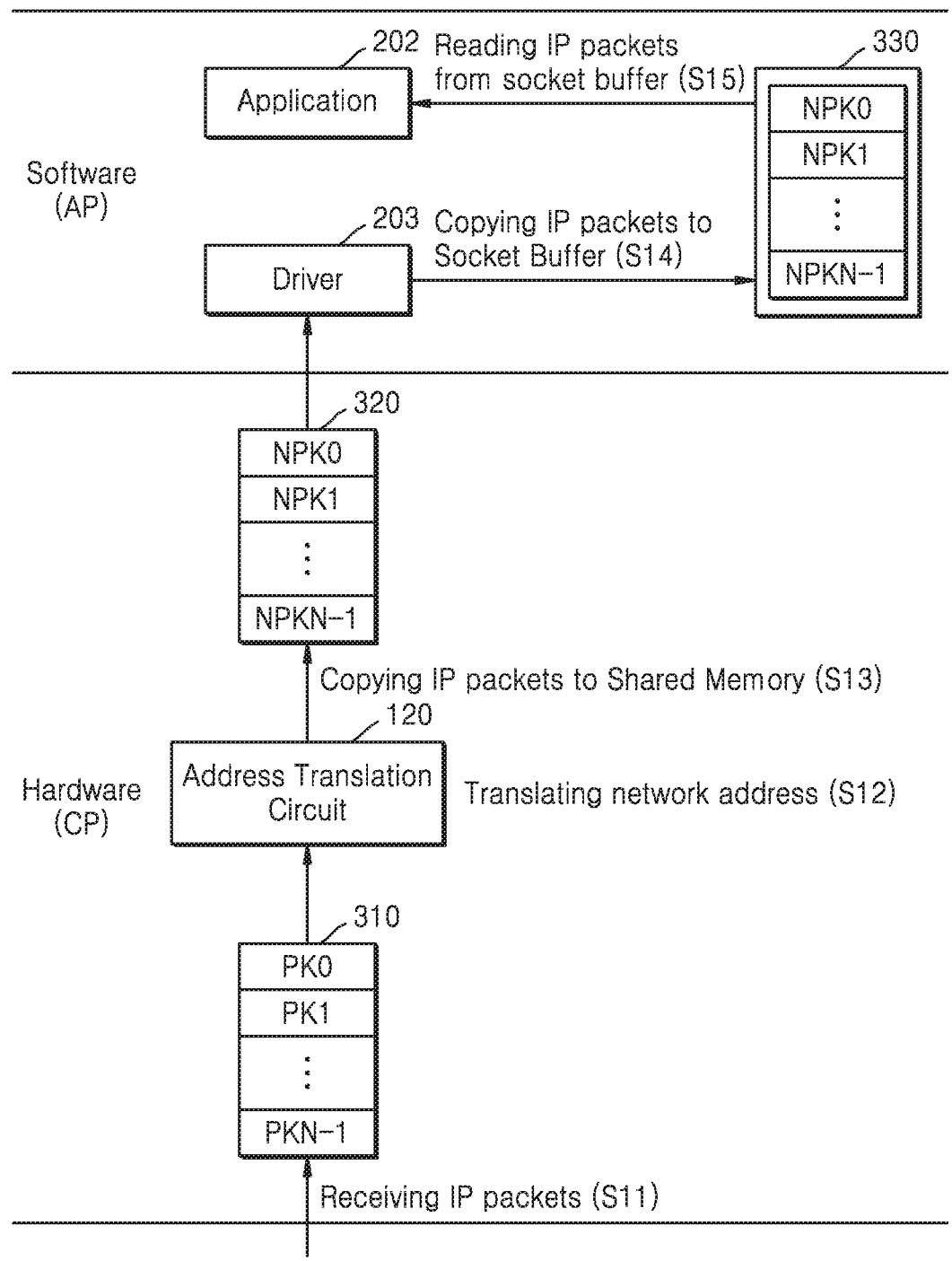
FIG. 13A illustrates the movement of an IP packet in a communication device according to at least one example embodiment.
Figure 13B:
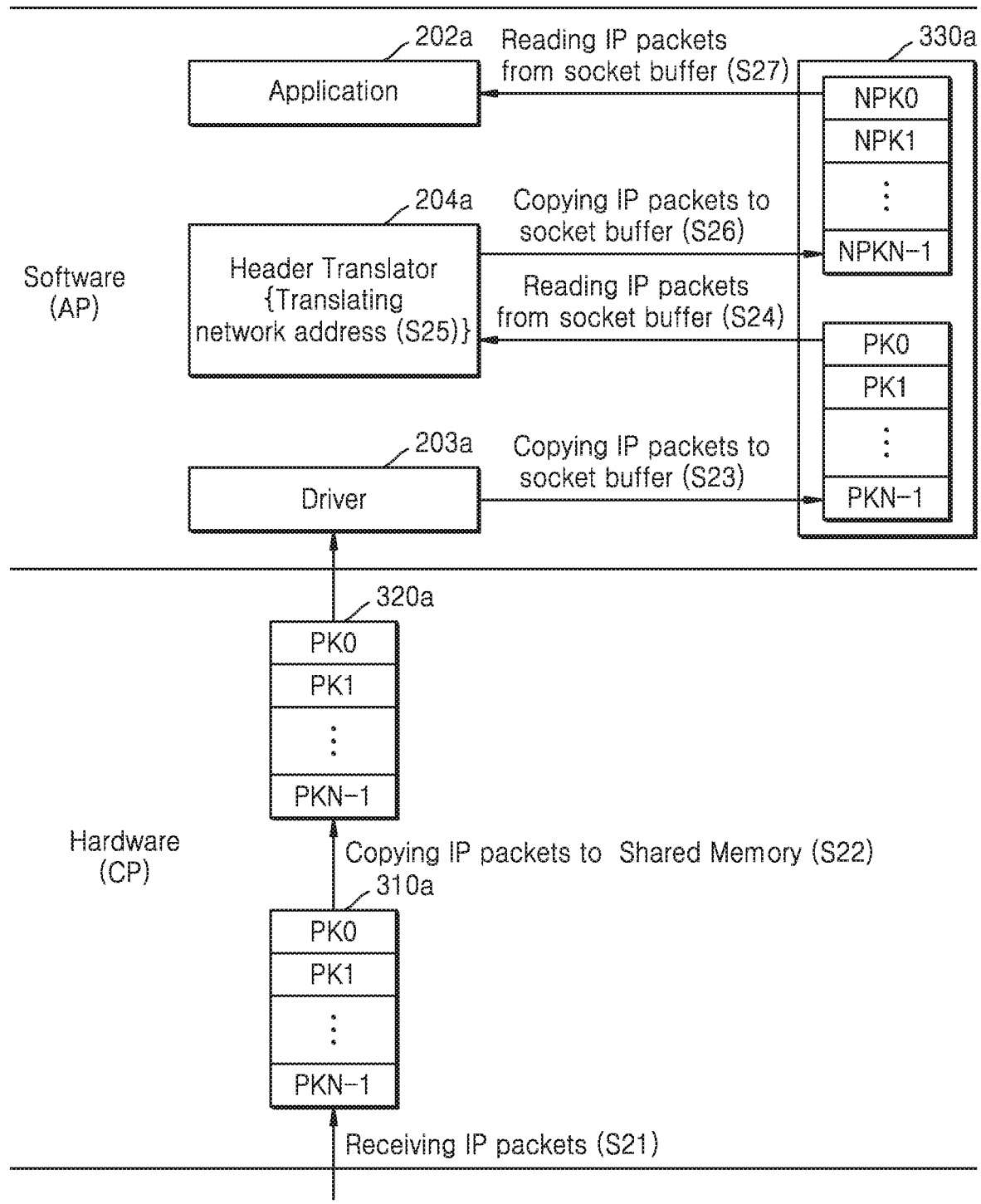
FIG. 13B illustrates the movement of an IP packet in a communication device according to at least one example embodiment.

FIG. 13A illustrates the movement of an IP packet in a communication device according to at least one example embodiment. FIG. 13B illustrates the movement of an IP packet in a communication device according to a comparative example. FIGS. 13A and 13B illustrate the movement of an IP packet, which is received from a network, in a hardware area (e.g., a communication processor CP) and a software area (e.g., an application processor AP).

Referring to FIG. 13A, IP packets may be received through the network (S11), and received IP packets PK0 to PKN−1 may be stored in a first memory 310 of the hardware area.

An address translation circuit 120 may translate network addresses of the IP packets (S12). As described with reference to FIGS. 2 to 9B, the address translation circuit 120 may receive headers of the IP packets and translate header formats or IP addresses. The address translation circuit 120 may copy (or store) the IP packets, for example, IP packets NPK0 to NPKN−1 including the translated network addresses, to (or in) a second memory 320 (e.g., a shared memory) (S13).

Subsequently, the IP packets NPK0 to NPKN−1 may be processed by the software area. A driver 203 may copy the IP packets NPK0 to NPKN−1 stored in the second memory 320 to a socket buffer (S14). For example, the socket buffer may a portion of a third memory 330 that is dedicated to the application processor AP.

The application program 202 may read the IP packets NPK0 to NPKN−1 from the socket buffer (S15).

Referring to FIG. 13B, IP packets may be received through the network (S21), and received IP packets PK0 to PKN−1 may be stored in a first memory 310a of the hardware area. The IP packets PK0 to PKN−1 may be copied to a second memory 320a (e.g., a shared memory) (S22).

Thereafter, the IP packets PK0 to PKN−1 may be processed by the software area. A driver 203a may copy the IP packets PK0 to PKN−1 stored in the second memory 320a to a socket buffer (S23). For example, the socket buffer may be a portion of a third memory 330a that is dedicated to an application processor AP, but is not limited thereto. Meanwhile, an address system of the IP packets PK0 to PKN−1 may not conform to an address system of an application program 202a configured to process the IP packets PK0 to PKN−1. Accordingly, a header translator 204a (e.g., a daemon program) may read the IP packets PK0 to PKN−1 from the socket buffer and/or translate network addresses of the IP packets PK0 to PKN−1 (S25). The header translator 204a and/or the driver 203a may recopy the IP packets NPK0 to NPKN−1 having the translated network addresses to the socket buffer (S26). Subsequently, the application program 202a may read the IP packets NPK0 to NPKN−1 from the socket buffer (S27).

When the movement of the IP packet in the communication device of FIG. 13A according to at least one example embodiment is compared with the movement of the IP packet in the communication device of FIG. 13B according to the comparative example, in the communication device according to the at least one example embodiment, the address translation circuit 120, which is based on hardware, may perform a network address translation in advance so that the application processor AP may not need to perform an address translation. Accordingly, the processing and/or memory load of the application processor AP may be reduced. Also, the number of times IP packets are copied to a memory may be reduced, thereby increasing a processing speed of the IP packets.

Figure 14:
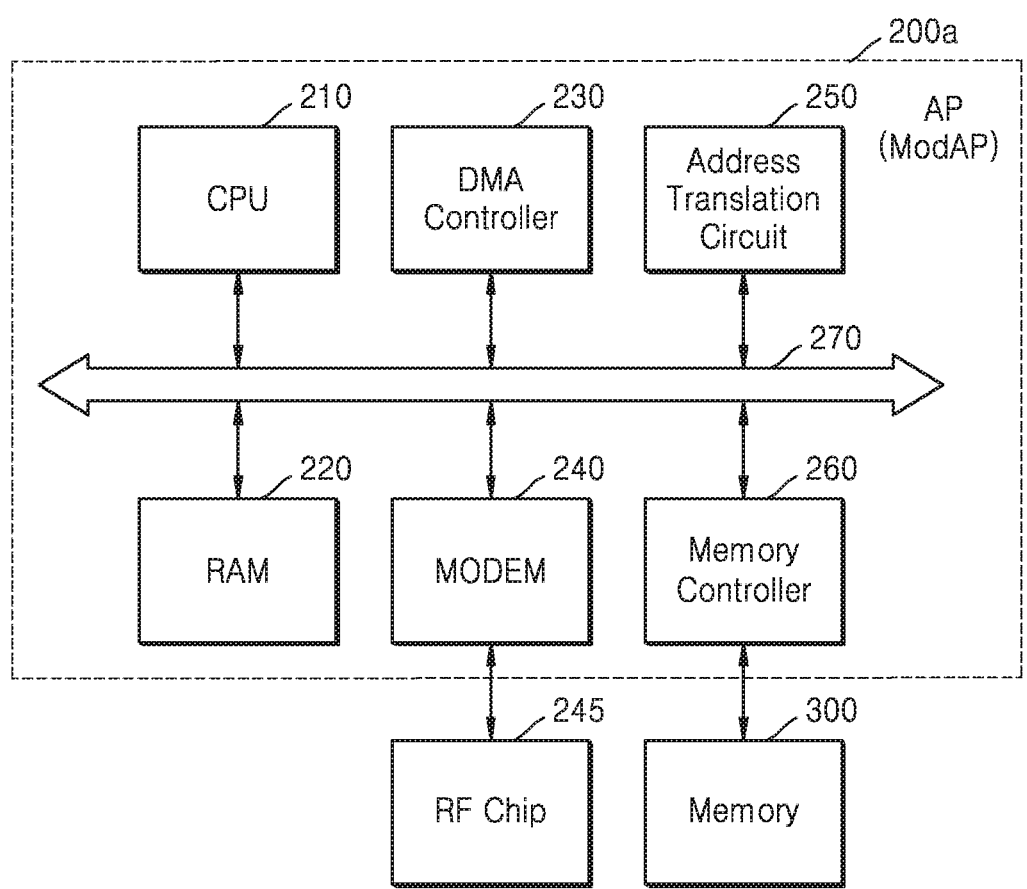
FIG. 14 is a block diagram of an application processor according to at least one example embodiment.

FIG. 14 is a block diagram of an application processor 200a according to at least one example embodiment.

The application processor 200a of FIG. 14 may be referred to as a ModAP because a function of a modem is integrated in the application processor 200a.

Referring to FIG. 14, the application processor 200a may be embodied by a system-on-chip (SoC) and may include a CPU 210, RAM 220, a DMA controller 230, a modem 240, an address translation circuit 250, and/or a memory controller 260, etc. In addition, the application processor 200a may further include other components, for example, a power management unit, a display controller, and/or a sensor, etc. Components of the SoC may transmit and receive data through a bus 270.

The CPU 210 may control all operations of the application processor 200a. The CPU 210 may process and/or execute at least one program (e.g., computer readable instructions, etc.) and/or data stored in the RAM (or ROM) 220 and control operations of the components of the application processor 200a. In at least one example embodiment, the CPU 210 may be embodied by a multi-core processor, a plurality of interconnected processors, a distributed processing system, and/or a cloud computing processing system, etc. The multi-core processor may be a single computing component including at least two independent cores.

The RAM 220 may temporarily store programs (e.g., an operating system, applied programs, computer readable instructions thereof, etc.), data, or instructions. For example, the programs and/or data stored in the memory 300 may be temporarily stored in the RAM 220 via the control of the CPU 210 or a booting code. The RAM 220 may be embodied by DRAM, SRAM, etc.

The DMA controller 230 may support data transmission between the components of the application processor 200a and control data to be directly transmitted between the components of the application processor 200a without interference by the CPU 210.

To perform wired and/or wireless communication, the modem 240 may modulate data to be transmitted according to a wired and/or wireless environment and restore received data. The modem 240 may perform digital communication with an RF chip 245, but is not limited thereto.

The RF chip 245 may convert a high-frequency signal received through an antenna into a low-frequency signal and transmit the converted low-frequency signal to the modem 240. Also, the RF chip 245 may convert a low-frequency signal received from the modem 240 into a high-frequency signal and transmit the converted high-frequency signal to a wireless network through the antenna. Also, the RF chip 245 may amplify and/or filter signals.

In addition, operations of the modem 240, the address translation circuit 250, and the memory controller 260 may be the same as or similar to the operations of the modem 150, the address translation circuit 120, and the memory interface 160 of FIG. 11. Accordingly, repeated descriptions thereof will be omitted.

As described above, the application processor 200a according to at least one example embodiment may include some components (e.g., the modem 240 and the address translation circuit 250) configured to perform communication functions. In this case, since the address translation circuit 250 performs a network address translation in advance, the CPU 210 may not need to perform an address translation. The load of the CPU 210 may be reduced, and the number of times IP packets are copied to the memory 300 may be reduced, and thus, a processing speed of the IP packets may be increased. Accordingly, the performance of the application processor 200a may be improved.

While the inventive concepts has been particularly shown and described with reference to various example embodiments thereof, it will be understood that various changes in form and details may be made therein without departing from the spirit and scope of the following claims.

What is claimed is:

1. A communication system configured to transceive at least one packet through a network, the communication system comprising:
   a modem circuit configured to modulate the at least one packet into a transmission signal to be transmitted to the network, and demodulate a received signal from the network into the at least one packet; and
   an address translation circuit configured to translate a network address of the at least one packet, the translating the network address of the at least one packet including,
      receiving a header of the at least one packet from an external memory in which the at least one packet is stored,
      storing the header of the at least one packet in an embedded memory,
      translating a format of the header of the at least one packet, and
      translating an address included in the header of the at least one packet; and
   the address translation circuit is further configured to,
      determine whether a format translation is desired based on desired first filtering items, and
      change at least some of a plurality of fields included in the header to corresponds to a target IP version in response to the format translation being desired and update an IP header checksum field of the header based on the translated format.

2. The communication system of claim 1, wherein the address translation circuit includes a first translator circuit and a second translator circuit.

3. The communication system of claim 1, wherein the address translation circuit is further configured to change the header of the packet from a first format according to a version of an Internet protocol (IP) to a second format according to another version of the IP.

4. The communication system of claim 1, wherein the address translation circuit is further configured to translate an Internet protocol (IP) address of the packet from a public IP address into a private IP address, or translate the IP address from a private IP address into a public IP address.

5. The communication system of claim 1, wherein,
   in response to the address translation circuit operating as a receiving path, the address translation circuit is further configured to store a changed header in a shared memory; and
   the shared memory is configured to be shared between the address translation circuit and an external application processor.

6. The communication system of claim 5, wherein the address translation circuit is further configured to store a payload of the packet is directly into the shared memory without storing the payload in the embedded memory.

7. The communication system of claim 1, wherein the address translation circuit is further configured to:
   determine whether an address translation is desired based on desired second filtering items;
   change an Internet protocol (IP) address value and a port number included in the header based on results of the determining whether the address translation is desired; and
   update an IP header checksum field and a transmission protocol header checksum field of the header based on the changed IP address value and the changed port number.

8. The communication system of claim 1, wherein, in response to the address translation circuit operating as a receiving path, the address translation circuit is further configured to pre-process the at least one packet and post-process the at least one packet.

9. The communication system of claim 1, wherein, in response to the address translation circuit operating as a transmission path, the address translation circuit is further configured to pre-process the at least one packet and post-process the at least one packet.

10. A device comprising:
    a memory;
    a communication processor configured to translate a network address of a first packet received through a network, and store a second packet including the translated network address in the memory; and
    an application processor configured to receive the second packet from the memory, drive an application program, and process the second packet, wherein
    the first packet includes a header and a payload, and the first packet is stored in a first dedicated memory;
    the communication processor includes an internal buffer; and
    the communication processor is further configured to copy the header of the first packet to the internal buffer, and translate the network address included in the header of the first packet, and
    the communication processor further includes,
       an embedded memory configured to store a header of the first packet,
       a first address translation circuit configured to translate an Internet protocol (IP) version of an IP header included in the header of the first packet, and
       a second address translation circuit configured to translate an IP address included in the header of the first packet.

11. The device of claim 10, wherein the first address translation circuit is further configured to translate an IPv4 header included in the header of the first packet into an IPV6 header, or translate an IPv6 header included in the header of the first packet into an IPv4 header.

12. The device of claim 10, wherein the second address translation circuit is further configured to translate a public IP address included in the header of the first packet into a private IP address.

13. The device of claim 10, wherein, in response to the first address translation circuit performing an IP version translation operation on the first packet, the second address translation circuit is further configured to perform an IP address translation operation on the first packet.

14. The device of claim 10, wherein the application processor is further configured to copy the second packet stored in the memory to a second dedicated memory.

15. An application processor including a communication function, the application processor comprising:
    at least one processor configured to execute an application program;
    a memory configured to be accessed by the at least one processor; and
    an address translation circuit configured to,
       translate a network address included in a first header of at least one packet received from a network to conform to an address system of the application program, and
       store a second header including the translated network address in the memory, wherein the address translation circuit includes a buffer configured to,
- receive the first header of the at least one packet and store the first header,
- translate a format of the first header,
- translate an address included in the first header, and
- update an IP header checksum of the first header, and the address translation circuit is further configured to,
- determine whether a format translation is desired based on desired first filtering items,
- change at least some of a plurality of fields included in the first header to corresponds to a target IP version in response to the format translation being desired, and
- update an IP header checksum field of the first header based on the translated format.

\* \* \* \* \*